United States Patent
Hamilton et al.

(10) Patent No.: US 8,694,768 B2
(45) Date of Patent: Apr. 8, 2014

(54) DETERMINATION AND DISPLAY OF LUN ENCRYPTION PATHS

(75) Inventors: David B. Hamilton, Milpitas, CA (US);
Marcus Thordal, Los Gatos, CA (US);
Prakash Kaligotla, Milpitas, CA (US);
Hui-Lin Li, Sunnyvale, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 106 days.

(21) Appl. No.: 13/094,242

(22) Filed: Apr. 26, 2011

(65) Prior Publication Data

US 2011/0283100 A1    Nov. 17, 2011

Related U.S. Application Data

(60) Provisional application No. 61/334,391, filed on May 13, 2010.

(51) Int. Cl.
*H04L 9/08* (2006.01)
*H04L 29/06* (2006.01)

(52) U.S. Cl.
CPC .................. *H04L 63/045* (2013.01)
USPC ............ 713/150; 709/225; 709/226; 709/229

(58) Field of Classification Search
USPC ........................... 713/150; 709/225–226, 229
See application file for complete search history.

(56) References Cited

U.S. PATENT DOCUMENTS

| | | | |
|---|---|---|---|
| 7,475,131 B2 * | 1/2009 | Achiwa et al. ................. | 709/223 |
| 7,895,162 B2 * | 2/2011 | Tanaka et al. ................. | 707/640 |
| 7,979,701 B1 * | 7/2011 | Gandhasri ...................... | 713/165 |
| 8,176,319 B2 * | 5/2012 | Osmond et al. ............... | 713/165 |
| 2002/0083339 A1 * | 6/2002 | Blumenau et al. ............ | 713/201 |
| 2006/0136735 A1 * | 6/2006 | Plotkin et al. ................. | 713/182 |
| 2008/0069362 A1 * | 3/2008 | Mimatsu ....................... | 380/278 |
| 2008/0235404 A1 * | 9/2008 | Awakura .......................... | 710/1 |
| 2009/0292932 A1 * | 11/2009 | Oyama et al. ................. | 713/310 |
| 2010/0106955 A1 * | 4/2010 | Odell ................................ | 713/2 |
| 2010/0205330 A1 * | 8/2010 | Noborikawa et al. ........... | 710/38 |
| 2010/0306635 A1 * | 12/2010 | Tang et al. ..................... | 714/807 |

OTHER PUBLICATIONS

Ismail Ari; Melanie Gottwals; Dick Henze, SANBoost: Automated SAN-Level Caching in Storage Area Networks, May 2004, IEEE, pp. 1-8.*

Verlin L. Hoberecht, SNA Function Management, Apr. 1980, IEEE, V. 28, pp. 1-10.*

* cited by examiner

*Primary Examiner* — Luu Pham
*Assistant Examiner* — Fahimeh Mohammadi
(74) *Attorney, Agent, or Firm* — Wong, Cabello, Lutsch, Rutherford & Brucculeri, L.L.P.

(57) ABSTRACT

A management station which manages the encryption devices in a SAN to set up encrypted LUNs. In setting up the encryption, the source and target ports are identified, along with the target LUN. LUN serial numbers used to identify unique LUNs. As paths to a given LUN are defined, the management station compares the path to existing paths and provides an indication if there is a mismatch in the encryption policies or keys being applied to the LUN over the various paths. This allows the administrator to readily identify when there is a problem with the paths to an encrypted LUN and then take steps to cure the problem. By determining the paths and then comparing them, the management station greatly simplifies setting up multipath I/O to an encrypted LUN or access by multiple hosts to an encrypted LUN.

3 Claims, 5 Drawing Sheets

DETERMINATION AND DISPLAY OF LUN ENCRYPTION PATHS

CROSS REFERENCE TO RELATED APPLICATIONS

This Application claims priority to U.S. Provisional application Ser. No. 61/334,391 entitled "Determination and Display of LUN Encryption Paths" filed May 13, 2010 and which is incorporated by reference in its entirety herein.

TECHNICAL FIELD

The present invention relates to the field of storage area networks, and in particular to data-at-rest encryption in storage area networks.

BACKGROUND ART

Managing operational risk by protecting valuable digital assets has become increasingly critical in modern enterprise information technology (IT) environments. In addition to achieving compliance with regulatory mandates and meeting industry standards for data confidentiality, IT organizations must also protect against potential litigation and liability following a reported breach.

In the context of data center fabric security, operators of Storage Area Networks (SANs) have desired fabric-based encryption services to secure data assets either selectively or on a comprehensive basis.

Most sensitive corporate data is stored in the data center, and the vast majority of data from critical applications resides in a SAN, enabling organizations to employ the intelligence of the storage fabric as a centralized framework in which to deploy, manage, and scale fabric-based data security solutions.

The storage fabric enables centralized management to support various aspects of the data center, from server environments and workstations to edge computing and backup environments, providing a place to standardize and consolidate a holistic data-at-rest security strategy. Organizations can also implement data-at-rest encryption in other parts of the data center, helping to protect data throughout the enterprise.

Most current industry solutions include either host-based software encryption, device-embedded encryption, or edge encryption, all of which provide isolated services to specific applications but typically cannot scale across extended enterprise storage environments.

Some solutions have provided centralized encryption services that employ key repositories such as provided by several vendors. These key repositories can be considered specialized secure databases of the encryption keys used by the SAN for encrypting data at rest on the media controlled by the SAN. Each key stored by the key repository is associated with a key identifier that can be used to obtain the key from the key repository. The key identifier is typically generated/chosen either by the key repository or by the encryption device/software externally to the key repository.

Generally SANs are formed so that redundant paths are available from the host devices to the storage devices. Host bus adaptors (HBAs) generally have two ports for this purpose. Thus, packets can exit either port and reach the storage device through either of two paths. This is referred to multipath I/O. However, when encryption capabilities are added to the SAN this multipath I/O can complicate encryption setup and management. Even though both paths will end up at the same logical unit (LUN) in the same storage unit, two different paths are used and different worldwide names (WWNs) are present at each end of each path. This creates problems when using encryption because encryption keys are associated with the WWNS of the ports. If not properly coordinated, data loss can occur because of mismatched keys or even encryption policies.

One purpose of a SAN is to allow multiple hosts to access the same storage unit and LUN. When encryption is provided for the LUN, this is a further source of possible errors. As above, different WWNs will be present at least at the host end, so the potential for different encryption policies or keys is present, much as in the multipath I/O case mentioned above.

It would be desirable to provide tools to simplify management of encrypted LUNs so that the chance of data corruption is minimized.

SUMMARY OF INVENTION

A management station according to a present invention manages the encryption devices in a SAN to set up encrypted LUNs. In setting up the encryption, the source and target ports are identified, along with the target LUN. LUN serial numbers are used to identify each LUN. As paths to a given LUN are defined, the management station compares the path to existing paths and provides an indication if there is a mismatch in the encryption policies or keys being applied to the LUN over the various paths. This allows the administrator to readily identify when there is a problem with the paths to an encrypted LUN and then take steps to cure the problem. By determining the paths and then comparing them, the management station greatly simplifies setting up multipath I/O to an encrypted LUN or access by multiple hosts to an encrypted LUN.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

Although the following disclosure is written in the context of a SAN, the scope of the present invention is not limited to a SAN, but includes any type of system in which a key repository is accessed by a key identifier for a key that is associated with media that has been or will be encrypted or decrypted using that key.

Figure 1:
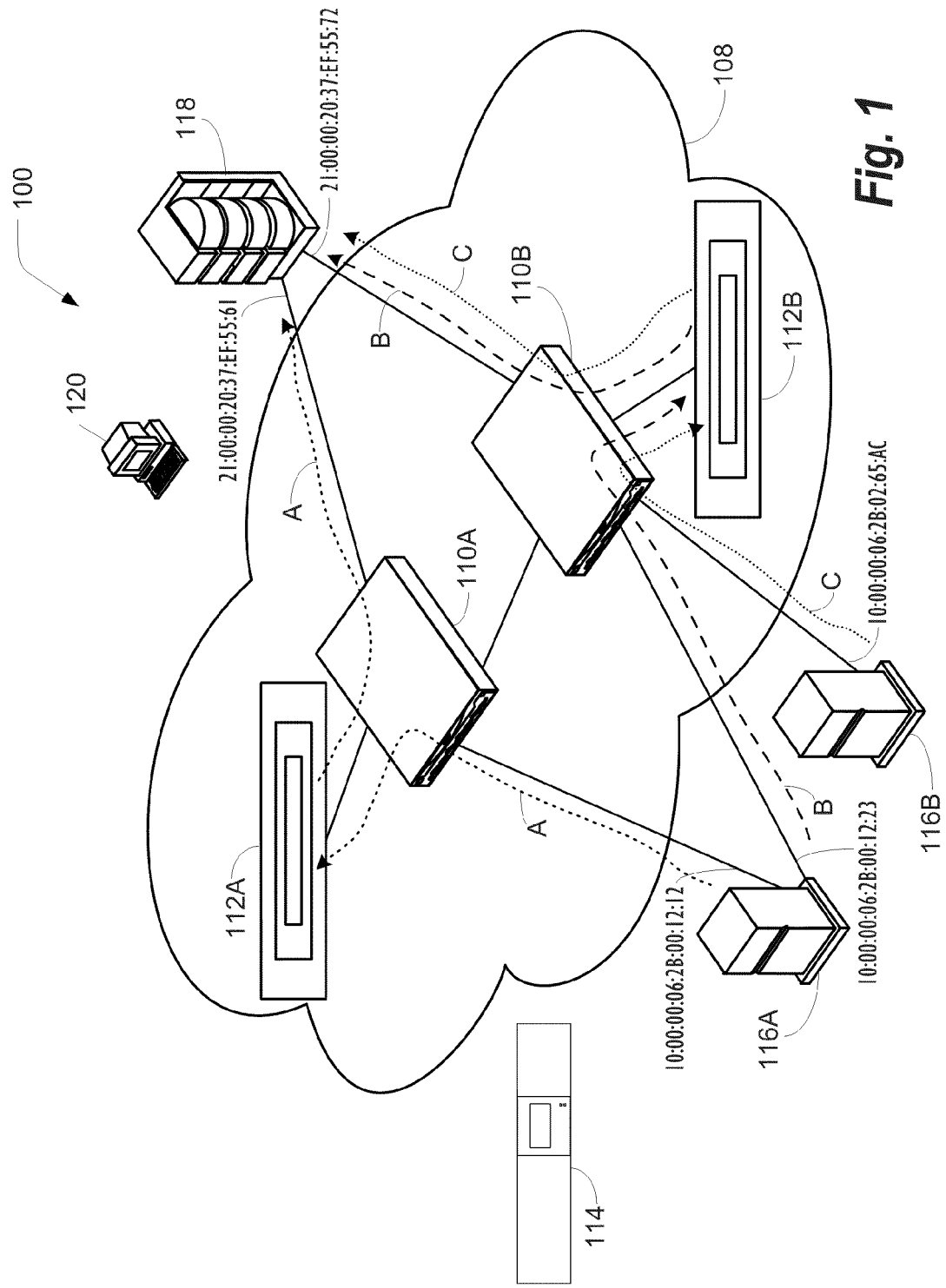
FIG. 1 is a block diagram illustrating an architecture for a SAN that employs embodiments of the present invention.

FIG. 1 is a block diagram illustrating an architecture for a SAN 100 that employs embodiments of the present invention. As illustrated in FIG. 1, the SAN fabric 108 includes two switches 110A and 110B. Encryption device 112A is connected to switch 110A to provide encryption services. A similar encryption device 112B is connected to switch 110B. A key repository 114 is connected to encryption devices 112A and 112B, in the preferred embodiment using a different network than fabric 108. The illustrated SAN 100 includes two hosts 116A and 116B. Host 116A is illustrated as having two ports. A first port is connected to switch 110A, while the second port is connected to switch 110B. The host 116B is shown having a single port connected to switch 110B. An exemplary storage device 118 is shown having two ports, one connected to switch 110A, and one connected to switch 110B. With this configuration, host 116A has multiple paths to reach storage device 118. A first flow path is illustrated by the dashed lines with the letter A, where data flows from host 116A, to switch 110A through encryption device 112A, back through switch 110A and then on to storage device 118. The parallel path is illustrated as the dashed line with the letter B, which goes from host 116A to switch 110B to encryption device 112B to switch 110B and to storage device 118. Because of the two paths, problems can develop, such as losing links between devices, and the host 116A will still be able to access the storage device 118. For completeness, the host 116B has a flow path C, indicated by the dashed line, which proceeds from host 116B to switch 110B to encryption device 112B to switch 110B and to storage device 118. For further discussion in this description, it is assumed that the storage device 118 has a LUN0 that is shared by hosts 116A and 116B.

As is well known to those skilled in the art, each port in a Fibre Channel environment includes a worldwide name (WWN). In the illustrated embodiment, the ports of host 116A have WWNs of 10:00:00:06:2B:00:12:12 and 10:00:00:06:2B:00:12:23, while the port of host 116B has world has a WWN of 10:00:00:06:2B:02:65:AC and the storage device 118 ports have WWNs 21:00:00:20:37:EF:55:61 and 21:00:00:20:37:EF:55:72.

Also illustrated is a management station 120 that is connected, in a separate fabric in a preferred embodiment, to the switches 110A, 110B, the encryption devices 112A, 112B, and the key repository 114. The management system 120 executes software to manage the SAN 100, which software provides the screens and operates as described below.

Although a single SAN fabric 108 is illustrated in FIG. 1 for clarity of the description, one of ordinary skill in the art will recognize that additional fabrics can be interconnect the hosts and storage in SAN fabric 108, which may span multiple locations, such as a data center, a disaster recovery site, and a branch office. In one embodiment, the management station 120 may provide management services to other SANs, in addition to the SAN 100.

Other servers or hosts, switches, and storage devices can be used in the SAN 100 illustrated in FIG. 1. The elements shown in FIG. 1 are illustrative and by way of example only, and other elements and other numbers and arrangements of elements, including other numbers of fabrics can be included as desired.

Figure 2:
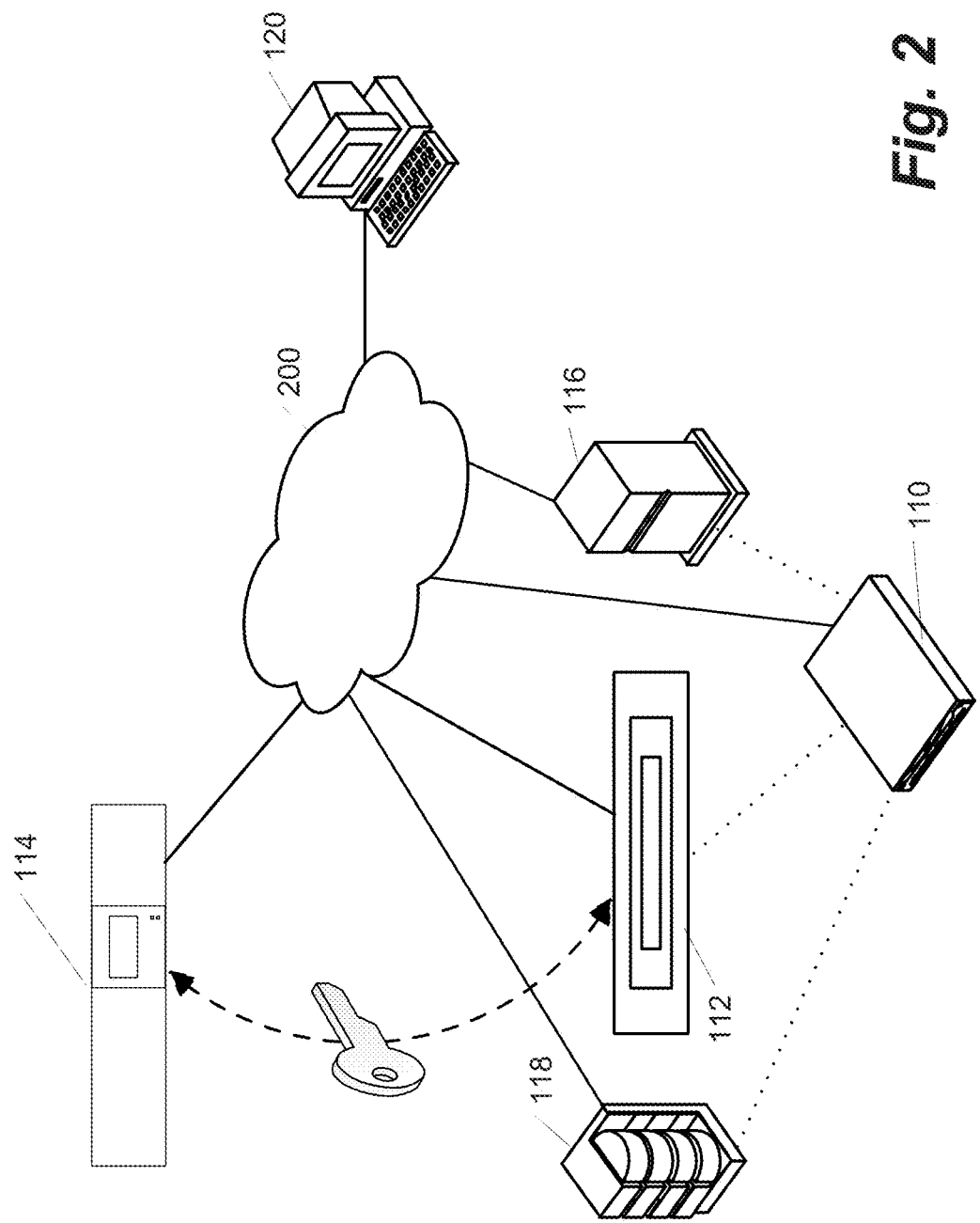
FIG. 2 is a block diagram illustrating an overview of communication paths used for management according to one embodiment.

FIG. 2 is a block diagram illustrating an overview of one embodiment of the communication paths used for key management for a system such as is illustrated in FIG. 1. The dashed lines in FIG. 2 illustrate the data flow of keys used in the fabric 108 of FIG. 1, while the solid lines are in this embodiment an Ethernet management local area network (LAN) 200 connecting the management station 120, the switch 110, the encryption device 112, the key repository 114, the host 116, and the storage device 118.

The host 116 initiates a read or write request to the target 118. Data-at-rest encryption has been used to encrypt the data stored in the target 118. The switch fabric 108 carries the request from the host 116 to the encryption device 112. The SAN fabric 108 is typically a Fibre Channel fabric and uses Fibre Channel protocols to pass requests and responses between the host 116 and the target 118. The encryption device 112 encrypts and decrypts the data read from or written to a logical unit (LUN) of the target 118.

Figure 3:
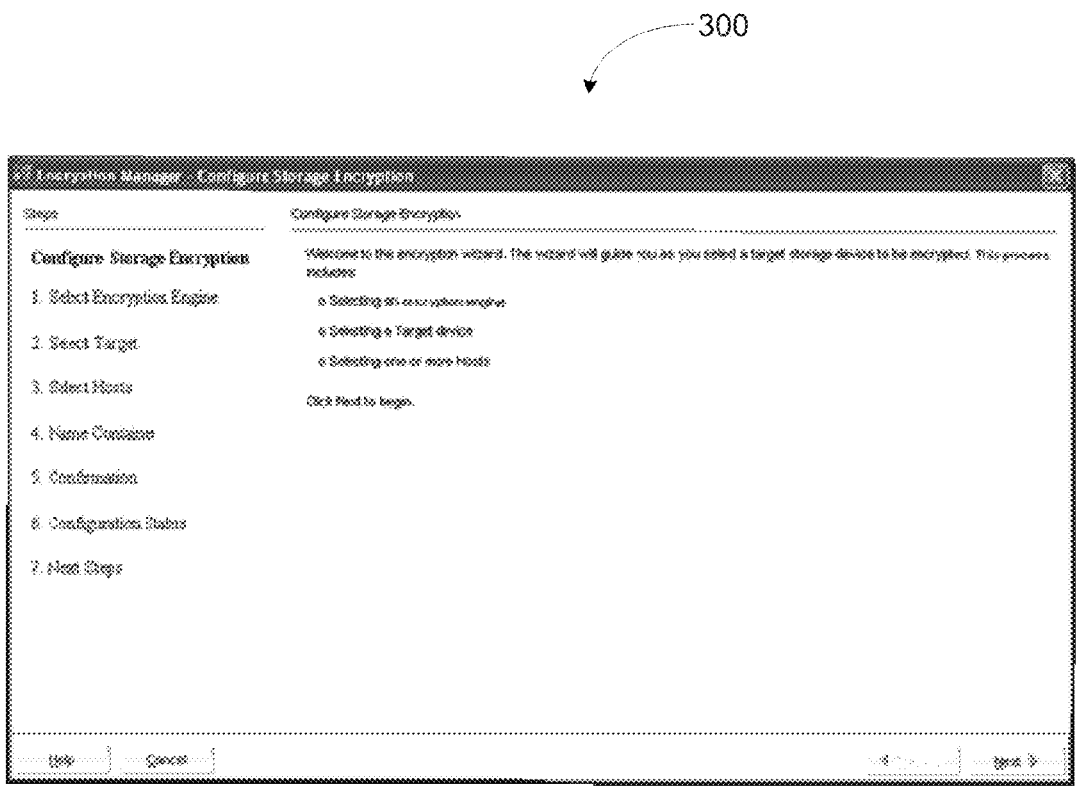
FIGS. 3-6 are screen shots of LUN encryption path entry screens according to one embodiment.
Figure 4:
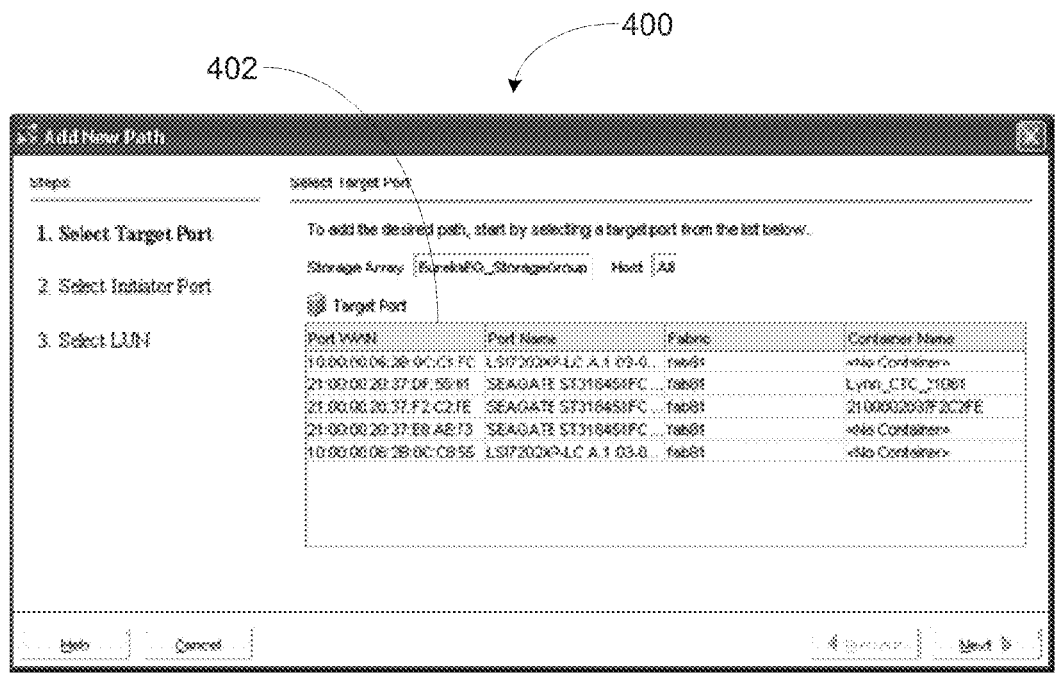
Figure 5:
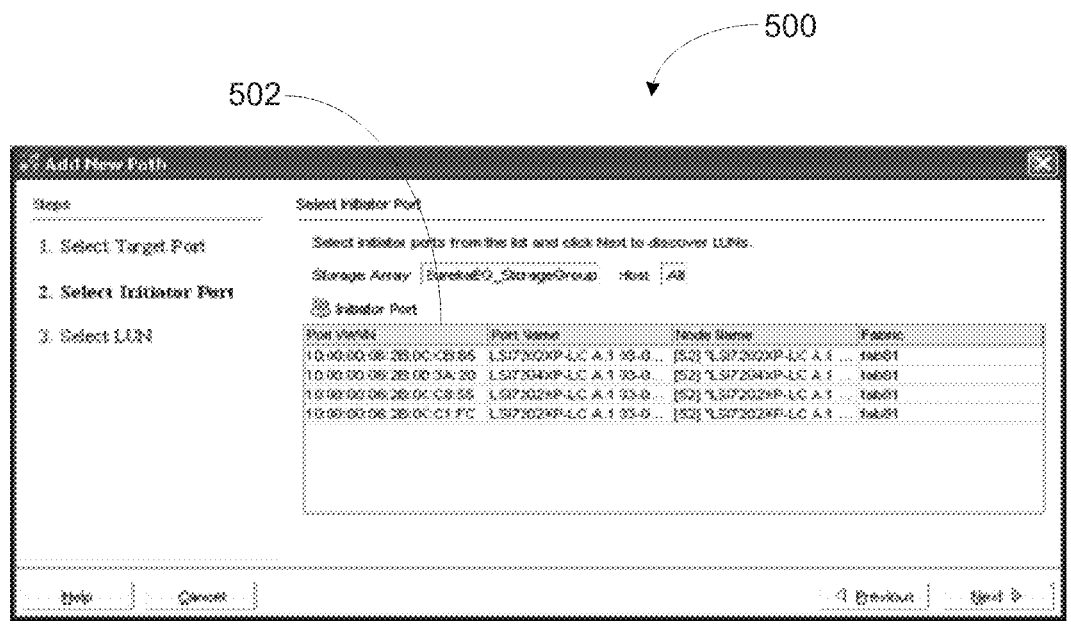
Figure 6:
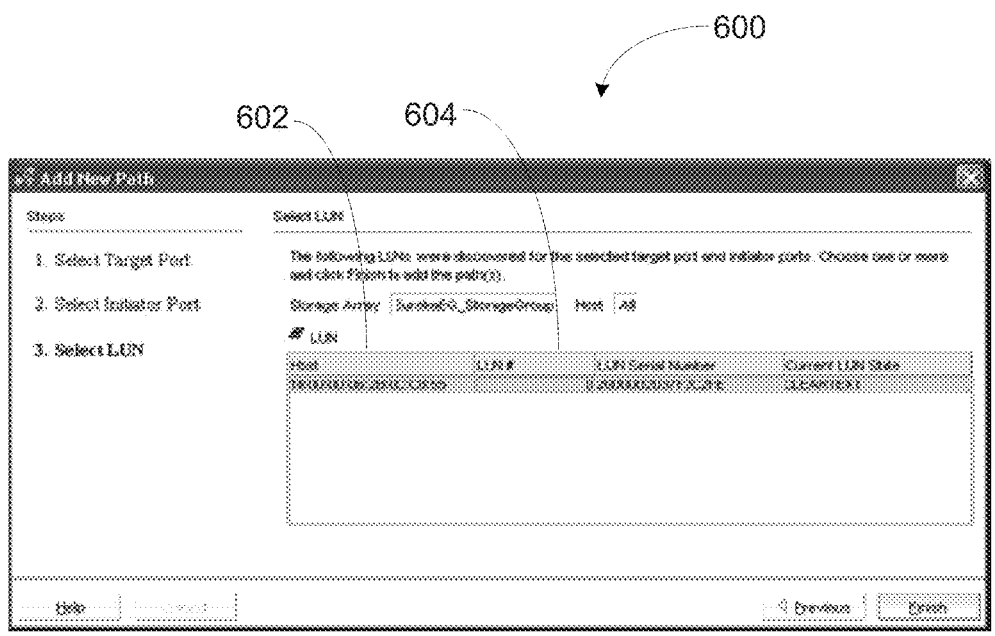

FIG. 3 represents a screenshot of a screen 300 of a wizard to configure encrypted paths to LUNs. The wizard guides the administrator in selecting a target device, a host, and the desired LUN in the target. After those selections are completed, a LUN path screen, with any errors shown as will be described below, is provided. FIG. 4 is a screenshot of screen 400, the first step of adding a new path. The screen 400 is used to select the target port. The screen 400 illustrates the various target ports available for connection in the SAN 100. These are provided in a column 402, which indicates the port WWN. After the administrator selects a desired port, the screen 500 illustrated in FIG. 5 is presented. The screen 500 is used to select the desired initiator or host port to conform to FIG. 1. A column 502 indicates the available port WWN for the host or initiators. After the administrator has selected the desired initiator port, he hits the next button and the screen 600 of FIG. 6 is provided. In progressing from screen 500 to screen 600, the management station 120 software will have determined the available LUNs in the selected storage device for that particular host. Those LUNs are displayed in screen 600. The first column 602 lists the host port WWN, while a second column 604 indicates the available LUNs. After the administrator selects the desired LUNs, he hits finish and the management system 120 prepares the path by properly interfacing with the switch 110 and the encryption device 112, including applying the proper encryption mode and state.

Figure 7:
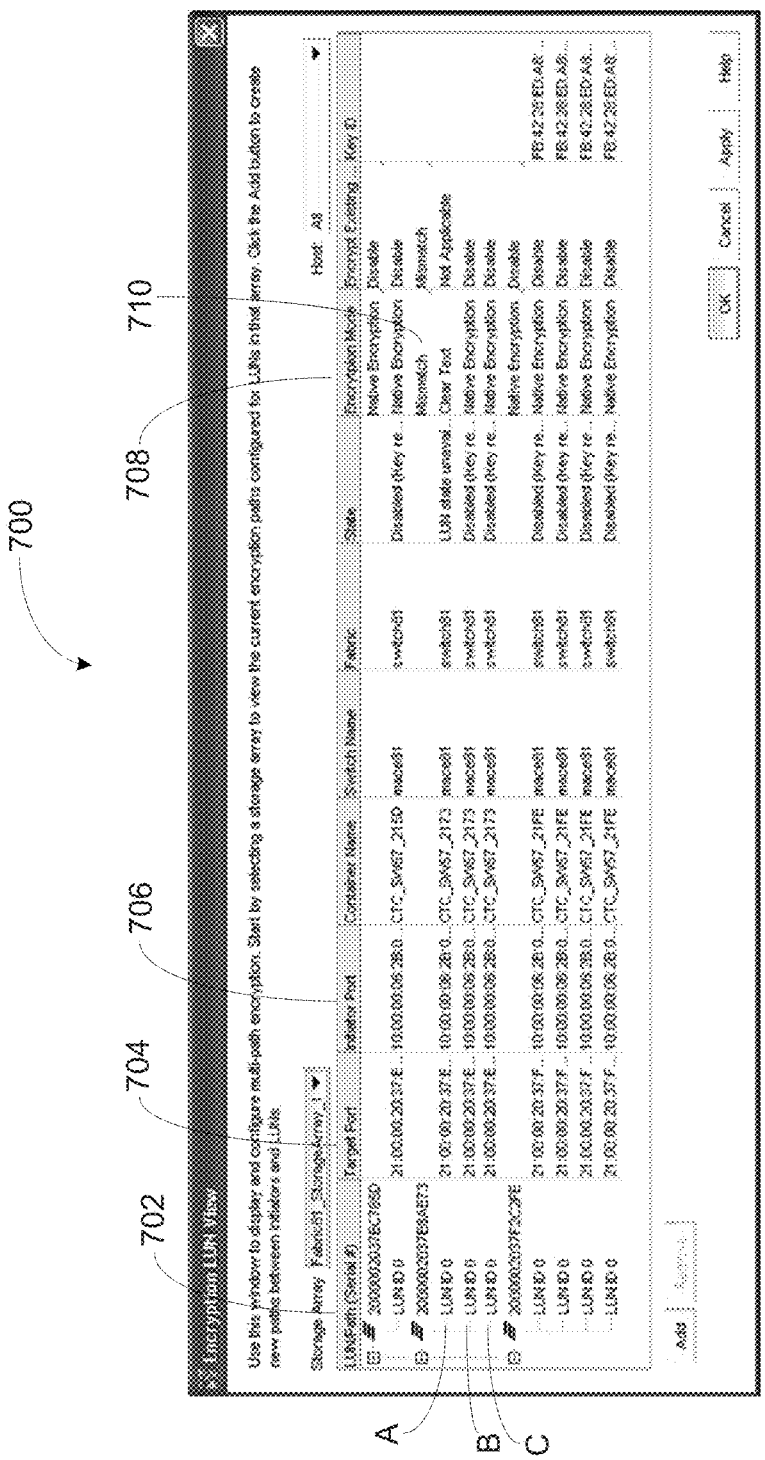
FIG. 7 is a screen shot of a LUN encryption path screen according to one embodiment.

FIG. 7 illustrates a screen 700 that shows a number of paths to various LUNs. Used as exemplary are three paths illustrated by paths A, B, C that correspond to the paths A, B, and C in FIG. 1. A first column 702 is provided to indicate the serial number of the LUN. A second column 704 indicates the target port, while a third column 706 indicates the initiator or host port. The LUN, the target port and the initiator port should tie to the items just selected by the administrator in the previous Figures. Column 708 is an encryption mode column. This column provides the encryption mode for that particular path. It is noted that with respect to the serial number of interest, a field mismatch 710 is indicated. This is because the encryption modes of the paths A, B, and C are not identical. Embodiment path A is indicated as clear text, while paths B and C are native encryption. This condition could cause data corruption as discussed above and therefore must be avoided. If the wizard described above had been used for each path, no mismatch would be present. However, many administrators prefer to administer devices using a command line interface (CLI). Using a CLI the mismatch condition can easily develop. When the screen is presented, the mismatch condition is immediately and readily apparent to the administrator and can be corrected, hopefully before the path is placed in the service or any data is stored. In the preferred embodiment, the administrator can click on the mismatch entry 710 and a field providing a selection of various encryption modes appears. The administrator selects one of the desired encryption modes and status, such as clear text or native encryption and disabled or enabled, and that mode is applied to all of the paths for that particular LUN. In the illustrated case, path A would be converted from clear text to native encryption and paths B and C would remain the same, assuming that the administrator had selected native encryption.

Thus, it can be seen that by the described encrypted LUN path entry technique and screen display, it is much easier for an administrator to determine multipath mismatch situations and correct those errors.

For a more detailed description of encryption devices and data flow in a SAN, please reference U.S. patent application Ser. No. 12/541,784, entitled "Developing Initial and Subsequent KeyID Information from a Unique MediaID Value," by Prakash Bilodi, Narada Hess and Lundon Siao, filed on Aug. 14, 2009, which is hereby incorporated by reference.

Although the above description has been written in the context of embodiments using in-band devices such as encryption switches to encrypt and decrypt data passing between hosts and storage devices, the scope of the present invention is not limited to such embodiments. In some embodiments, instead of encryption and decryption occurring at intervening switches, the encryption and decryption may be performed at the storage devices of the SAN 100 that serve as targets, or at the hosts that serve as initiators of SAN requests. In some embodiments, the key repository may use in-band communication to the device performing encryption or decryption, allowing the initiator or target device to perform its own encryption or decryption using the keys retrieved from the key repository. Although described in the context of a SAN, the above-described techniques are applicable to any environment in which encryption keys are stored in a key repository.

Aspects of the invention are described as a method of control or manipulation of data, and may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for tangibly embodying information in a form readable by a machine (e.g., a computer). For example, a machine-readable medium (sometimes referred to as a program storage device or a computer readable medium) may include read-only memory (ROM), random-access memory (RAM), magnetic disc storage media, optical storage media, flash-memory devices, electrical, optical, and others.

The above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

While certain exemplary embodiments have been described in details and shown in the accompanying drawings, it is to be understood that such embodiments are merely illustrative of and not devised without departing from the basic scope thereof, which is determined by the claims that follow.

We claim:

1. A method for managing a storage area network, the method comprising:
   determining multiple paths from a host to a target logical unit (LUN) across the storage area network, comprising:
   indicating available targets;
   receiving a selection of a target;
   indicating available hosts;
   receiving a selection of a host;
   indicating available LUNs for a host-target combination;
   receiving a selection of a LUN; and
   defining a path after receiving the selection of a LUN, the path being one path of the multiple paths;
   determining an encryption mode for each of the multiple paths, wherein the encryption mode comprises one or more of encryption keys and encryption policies;
   identifying a mismatch in encryption modes corresponding to the multiple paths to the LUN; and
   presenting the identified mismatch in a user interface that allows correction of the identified mismatch.

2. A management system for a storage area network, the system comprising:
   a computer; and
   software stored on and executed by the computer, the software comprising instructions that when executed by the computer, cause the computer to:
   determine multiple paths from a host to a target logical unit (LUN) across a storage area network, comprising instructions that when executed cause the computer to:
   indicate available targets;
   receive a selection of a target;
   indicate available hosts;
   receive a selection of a host;
   indicate available LUNs for a host-target combination;
   receive a selection of a LUN; and
   define a path after receiving the selection of a LUN, the path being one path of the multiple paths;
   determine an encryption mode for each of the multiple paths, wherein the encryption mode comprises one or more of encryption keys and encryption policies;
   identify a mismatch in encryption modes corresponding to the multiple paths to the LUN; and
   present the identified mismatch in a user interface that allows correction of the identified mismatch.

3. A non-transitory machine-readable medium, upon which are stored instructions, comprising instructions that when executed cause a machine to:
   determine multiple paths from hosts to a target logical unit (LUN) across a storage area network, comprising instructions that when executed cause the computer to:
   indicate available targets;
   receive a selection of a target;
   indicate available hosts;
   receive a selection of a host;
   indicate available LUNs for a host-target combination;
   receive a selection of a LUN; and
   define a path after receiving the selection of a LUN, the path being one path of the multiple paths;
   determine an encryption mode for each of the multiple paths, wherein the encryption mode comprises one or more of encryption keys and encryption policies;
   identify a mismatch in encryption modes corresponding to the multiple paths to the LUN;
   presenting the identified mismatch in a user interface; and
   allow correction of the identified mismatch through the user interface.

* * * * *